United States Patent
Stimus et al.

(10) Patent No.: US 9,470,460 B2
(45) Date of Patent: Oct. 18, 2016

(54) HEAT EXCHANGER FOR POWER SYSTEM

(71) Applicant: Solar Turbines Inc., San Diego, CA (US)

(72) Inventors: Anthony R. Stimus, Spring Valley, CA (US); Alexander J. Quinn, San Diego, CA (US); Cesar G. Carpio, El Cajon, CA (US); Eric Kai-Shun Lin, San Diego, CA (US); Donald H. Cameron, Encinitas, CA (US)

(73) Assignee: Solar Turbines Incorporated, San Diego, CA (US)

( * ) Notice: Subject to any disclaimer, the term of this patent is extended or adjusted under 35 U.S.C. 154(b) by 386 days.

(21) Appl. No.: 14/050,798

(22) Filed: Oct. 10, 2013

(65) Prior Publication Data
US 2015/0101780 A1    Apr. 16, 2015

(51) Int. Cl.
| F28F 9/00 | (2006.01) |
| F28F 1/00 | (2006.01) |
| F28F 9/007 | (2006.01) |
| B60K 11/04 | (2006.01) |

(52) U.S. Cl.
CPC .............. *F28F 1/00* (2013.01); *F28F 9/007* (2013.01); *B60K 11/04* (2013.01); *F28F 2265/02* (2013.01); *F28F 2280/06* (2013.01)

(58) Field of Classification Search
CPC .............. F28F 1/00; F28F 9/007; F28F 7/00; F28F 9/002; F28F 9/013; F28F 2265/02; F28F 9/0219; F28F 2280/06; F28D 1/0435; F28D 1/0426; F28D 21/0014; F28D 7/06; F24D 3/14; F24F 2001/0037; F24F 2001/0048; F24F 1/0059; F24F 12/006; F24F 13/0227; B60K 11/04

USPC .............. 165/47, 53, 67, 149; 290/1 B
See application file for complete search history.

(56) References Cited

U.S. PATENT DOCUMENTS

| 6,092,591 | A | 7/2000 | McDonald et al. | |
| 8,176,854 | B2 * | 5/2012 | Smith, Jr. | B61C 5/02 105/26.05 |
| 8,587,136 | B2 * | 11/2013 | Williams | F01K 13/00 290/1 A |
| 2001/0023665 | A1 * | 9/2001 | Heidrich | F22B 37/244 122/510 |
| 2010/0240295 | A1 * | 9/2010 | Akhtar | F24F 1/0007 454/262 |
| 2012/0151933 | A1 * | 6/2012 | Ouplomb | B64D 41/00 60/772 |
| 2013/0306269 | A1 * | 11/2013 | Helbig | F28F 9/007 165/67 |
| 2014/0017989 | A1 * | 1/2014 | Ganesan | F24F 7/007 454/239 |
| 2014/0231059 | A1 * | 8/2014 | Nietupski | B64D 13/006 165/181 |

* cited by examiner

*Primary Examiner* — Marc Norman
*Assistant Examiner* — Jon T Schermerhorn
(74) *Attorney, Agent, or Firm* — James R. Smith

(57) ABSTRACT

The present disclosure provides a heat exchanger for a power system. The heat exchanger includes a housing. The housing includes a first side and a second side. The second side is configured to be received in a receptacle of a power system enclosure. The heat exchanger includes at-least one heat exchange tube supported between one or more of side walls of the housing. The heat exchanger includes a screen attached to the second side of the housing. The screen includes at-least one inlet opening for the heat exchange tube, and at-least one outlet opening for the heat exchange tube. The heat exchanger further includes a flange attached to the first side of the housing wherein the flange is configured to be removably attached to an outer surface around the receptacle of the power system enclosure.

20 Claims, 5 Drawing Sheets

HEAT EXCHANGER FOR POWER SYSTEM

TECHNICAL FIELD

Present disclosure relates to a power system and more particularly to a heat exchanger for the power system.

BACKGROUND

Typically a power system enclosure is designed to be space efficient to enable an ease of placement in various application areas. The power system enclosure accommodates a power source, multiple fire detectors, gas sensors, electricity fixtures and other such mountings and accessories. In cases where the power source may be a dual fuel engine a heat exchanger may also be provided in the power system. The heat exchanger may be used for many applications such as to receive hot air from the turbine compressor and cool it to provide purge air to a fuel line associated with the dual fuel engine. Conventional heat exchangers are bulky and large in size. Further, the heat exchanger may be configured to be fastened from an inside of the power system enclosure to one of the panels of the power system enclosure. The assembly process of the heat exchanger may be cumbersome due to interference with the various mountings and accessories associated with the power system. Moreover, placement of the heat exchanger reduces the effective space in the power system enclosure; hence, a displacement of the power source for service/repair may be obstructed.

U.S. Pat. No. 6,092,591 discloses an arrangement for mounting the top end of a heat exchange module to and between a pair of opposed support frame surfaces, the arrangement including an elongate transverse beam and a pair of end mounting assemblies. The elongate transverse beam is securable to the top end of the heat exchange module with the longitudinal extent of the transverse beam oriented in the direction from one opposed support frame surface toward the other opposed support frame surface. One longitudinal end of the transverse beam has a left hand overextension portion extending longitudinally beyond the portion of the transverse beam immediately below and the other longitudinal end of the transverse beam having a right hand overextension portion extending longitudinally beyond the portion of the transverse beam immediately below. The pair of end mounting assemblies of the top end mounting arrangement are each securable to one of the opposed support frame surfaces to extend therefrom toward the other opposed support frame surface. Each end mounting assembly is operable to mount a respective longitudinal end of the transverse beam to a respective one of the opposed support frame surfaces.

SUMMARY

In one aspect, the present disclosure provides a heat exchanger for a power system. The heat exchanger includes a housing. The housing includes a first side and a second side. The second side is configured to be received in a receptacle of a power system enclosure. The heat exchanger includes at-least one heat exchange tube supported between one and more of side walls of the housing. The heat exchanger includes a screen attached to the second side of the housing. The screen includes at-least one inlet opening for the heat exchange tube, and at-least one outlet opening for the heat exchange tube. The heat exchanger further includes a flange attached to the first side of the housing wherein the flange is configured to be removably attached to an outer surface around the receptacle of the power system enclosure In another aspect, the present disclosure provides a power system. The power system includes a power source. The power system includes a power system enclosure enclosing the power source. The power system further includes a heat exchanger. The heat exchanger includes a housing. The housing includes a first side and a second side. The second side is configured to be received in a receptacle of the power system enclosure. The heat exchanger includes at-least one heat exchange tube supported between one and more of side walls of the housing. The heat exchanger includes a screen attached to the second side of the housing. The screen includes at-least one inlet opening for the heat exchange tube, and at-least one outlet opening for the heat exchange tube. The heat exchanger further includes a flange attached to the first side of the housing wherein the flange is configured to be removably attached to an outer surface around the receptacle of the power system enclosure.

Other features and aspects of this disclosure will be apparent from the following description and the accompanying drawings.

DETAILED DESCRIPTION

Figure 1:
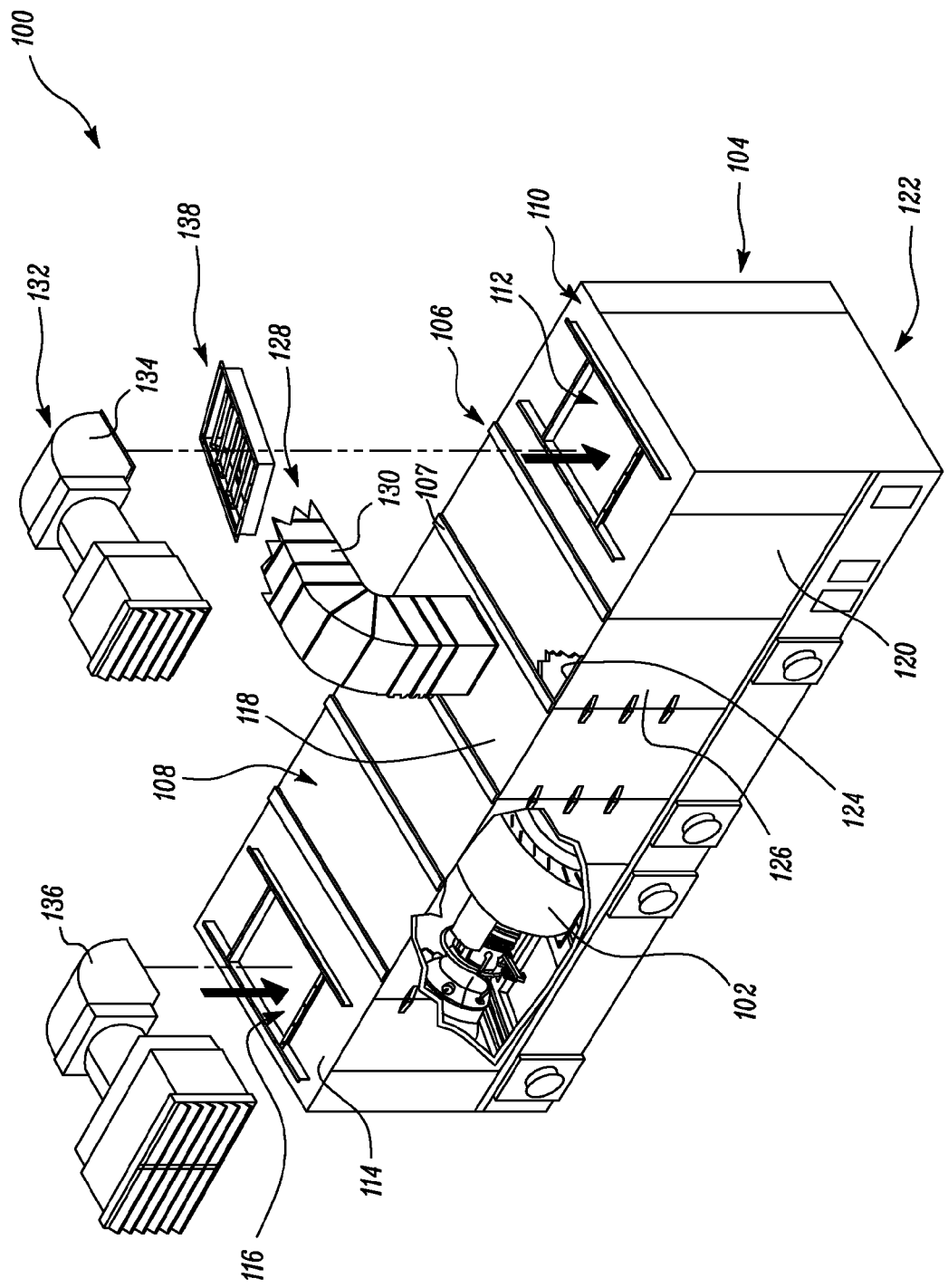
FIG. 1 illustrates an exploded perspective view of a power system.

The present disclosure relates to a heat exchanger for a power system. FIG. 1 illustrates an exploded perspective view of an exemplary power system 100. The power system 100 includes a power source 102 enclosed in a power system enclosure 104. According to an aspect of the present disclosure, the power source 102 shown here is a turbine engine. The power source 102 may drive a generator, compressor, or any other type of driven equipment as commonly known in the art. However, in other embodiments the power system 100 may be any type of dual-fuel power generation system such as a turbine engine coupled to a generator, reciprocating engine such as a diesel engine, or a gas engine, or other compressor sets and mechanical drive assemblies (CS/MD) as commonly known in the art. The power system 100 may be used to power any industrial or commercial setup such as chemical industries, refineries, mining industries, textiles, tires & rubber industries, IT facilities, food processing & beverages, hospitals, hotels, resorts, pharmaceuticals, educational setups, etc., and other engine powered applications.

In an aspect of the present disclosure, the power system enclosure 104 (hereinafter interchangeably used as enclosure 104) encloses the power source 102. The enclosure 104 is designed such that it may accommodate the power source 102 for fixed and/or mobile applications. Hence it will be appreciated by a person ordinarily skilled in the art that any shape, size and dimension of the enclosure 104 corresponding to the power source 102 may be contemplated to accommodate the power source 102 therein. However, in an embodiment as illustrated in FIG. 1, the enclosure 104 may have a cuboidal shape. The enclosure 104 includes a frame 106 disposed around the power source 102. The frame includes a roof internal support channel 107. The enclosure 104 includes a roof 108 attached to the roof internal support channel 107 of the frame 106. The roof 108 may include a first end panel 110 including an inlet receptacle 112, a second end panel 114 including an outlet receptacle 116, and one or more intermediate panels 118. One or more side panels 120 are configured to be attached to the frame 106 and form one or more walls 122 of the enclosure 104. Alternatively, in an embodiment not illustrated herein, the inlet receptacle 112 and the outlet receptacle 116 may be disposed on the side panels 120. In the present disclosure, for ease of understanding, a surface of the panels 110, 114, 118 and 120 on the inside of the enclosure 104 will be referred to as an inner surface 124 of the panels 110, 114, 118 and 120, and a surface of the panels 110, 114, 118 and 120 on the outside of the enclosure 104 will be referred to as an outer surface 126 of the panels 110, 114, 118 and 120.

In an embodiment, the power system enclosure 104 includes a power source air system 128. The power source air system 128 includes an inlet 130 and an exhaust (not shown). The inlet 130 may provide atmospheric air to the power source 102 for combustion of fuel. The exhaust may discharge exhaust gases coming from the power source 102 after combustion of the fuel. During operation of the power source 102, the exhaust gases may be released into the power system enclosure 104.

In an embodiment, as illustrated in FIG. 1, the inlet 130 is shown to be connected to one of the intermediate panels 118. However, in alternate embodiments, the inlet 130 may be positioned and connected to any other suitable portion of the enclosure 104, such as, on any one of the walls 122 of the enclosure 104.

In an embodiment, as illustrated in FIG. 1, the power system enclosure 104 includes a ventilation system 132. The ventilation system 132 includes an enclosure inlet vent component 134 and an enclosure outlet vent component 136 disposed on the inlet receptacle 112 and the outlet receptacle 116, provided on one of the panels 110, 114, 118 and 120. The enclosure inlet vent component 134 may be configured to draw air into the enclosure 104. The enclosure outlet vent component 136 may be configured to exhaust air from within the enclosure 104. Air entering the enclosure inlet vent component 134 may flow around the power source 102 and exit out of the enclosure 104 via the enclosure outlet vent component 136. Therefore, the ventilation system 132 may be configured to ventilate the power system enclosure 104. It will be apparent to a person ordinarily skilled in the art that the receptacles 112, and 116 referred to herein define openings to allow attachment of the enclosure inlet vent component 134 and the enclosure outlet vent component 136.

In the preceding embodiments, it is disclosed that the inlet receptacle 112 and the outlet receptacle 116 may be located on the first end panel 110 and the second end panel 114 of the roof 108 respectively, or in other embodiments on the side panels 120. However, a person having ordinary skill in the art may acknowledge that the locations of the receptacles 112, and 116, on the respective panels 110, and 114 may be based on a position of the power system 100, the power source 102 and the ventilation system 132 with respect to the enclosure 104 such that the ventilation system 132 may connect at appropriate positions on the enclosure 104. Therefore, it may be noted that the locations of the receptacles 112, and 116 disclosed herein are exemplary in nature and may change depending on inter-relative positions of the power system 100, the power source 102, the enclosure 104, and the ventilation system 132.

According to an aspect of the present disclosure, the power system 100 includes a heat exchanger 138. The heat exchanger 138 may be disposed in one of the inlet receptacle 112 and the outlet receptacle 116 located on one or more of the roof 108 or the side panels 120 of the enclosure 104. In an embodiment as illustrated in FIG. 1, the heat exchanger 138 is configured to be received in the inlet receptacle 112 disposed on the first end panel 110 of the enclosure 104.

Figure 3:
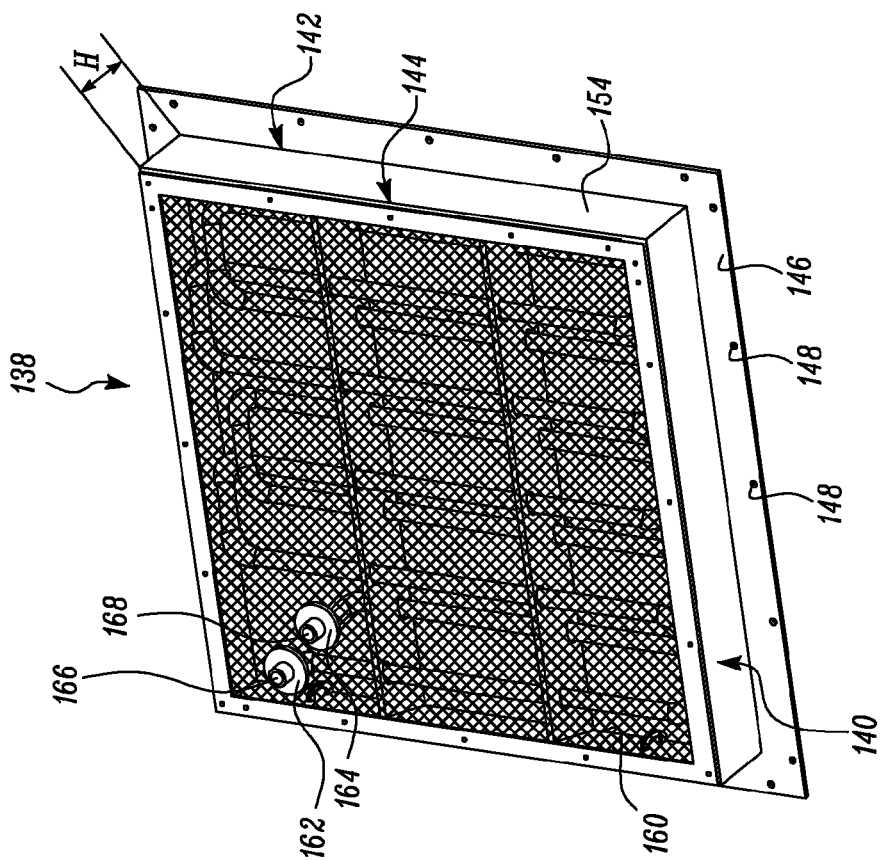
FIG. 3 illustrates a bottom perspective view of the heat exchanger.
Figure 2:
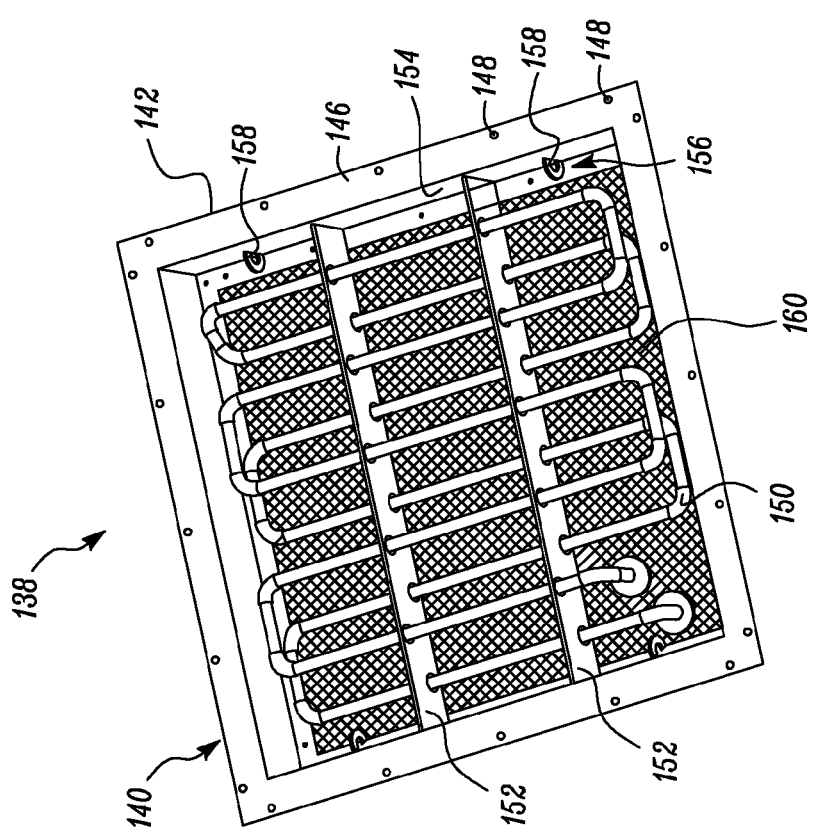
FIG. 2 illustrates a top perspective view of a heat exchanger.

FIG. 2 and FIG. 3 illustrate a top perspective view and a bottom perspective view of the heat exchanger 138 of the present disclosure. In an embodiment as illustrated in FIG. 2, the heat exchanger 138 includes a housing 140. The housing 140 includes a first side 142 and a second side 144. In an embodiment, a distance between the first side 142 and the second side 144 is referred to as the height (H) of the heat exchanger 138. In an aspect of the present disclosure, the height (H) of the heat exchanger 138 lies in a range of about 4 inches to 6 inches. The first side 142 includes a flange 146 attached thereto. The flange 146 includes one or more threaded receptacles 148 therein.

In an embodiment as illustrated in FIG. 2, the heat exchanger 138 includes a heat exchange tube 150 supported by one or more supports 152 extending between one or more of side walls 154 of the housing 140. However, in other embodiments, the heat exchanger 138 may include a plurality of heat exchange tubes 150 supported by the housing 140. In an embodiment, the heat exchanger 138 disclosed herein is an air to air heat exchanger.

The heat exchanger 138 further includes a lifting arrangement 156. The lifting arrangement 156 may include one or more lifting eyes 158 attached to the side walls 154 of the heat exchanger 138. The lifting eyes 158 are configured to enable a lifting of the heat exchanger 138 such that the heat exchanger 138 may be lifted and disposed in the inlet receptacle 112 and releasably fastened to the outer surface 126 of the panels 110, 114, 118 and 120 disposed on the roof 108 and/or the walls 122. However, in other embodiments, the heat exchanger 138 may include other types of lifting arrangement 156 like curved or angled hooks, clasps, holders, and other gripping and lifting means as commonly known in the art.

As illustrated in FIG. 3, the heat exchanger 138 includes a screen 160 attached to the second side 144 of the heat exchanger 138. In an embodiment, the screen 160 may be a stainless steel cross-meshed screen. However, in other embodiments, the screen 160 may be a baffle-mesh screen or the like as commonly known in the art. The screen 160 includes an inlet opening 162 and an outlet opening 164 configured to receive an inlet end 166 and an outlet end 168 of the heat exchange tube 150.

Figure 4:
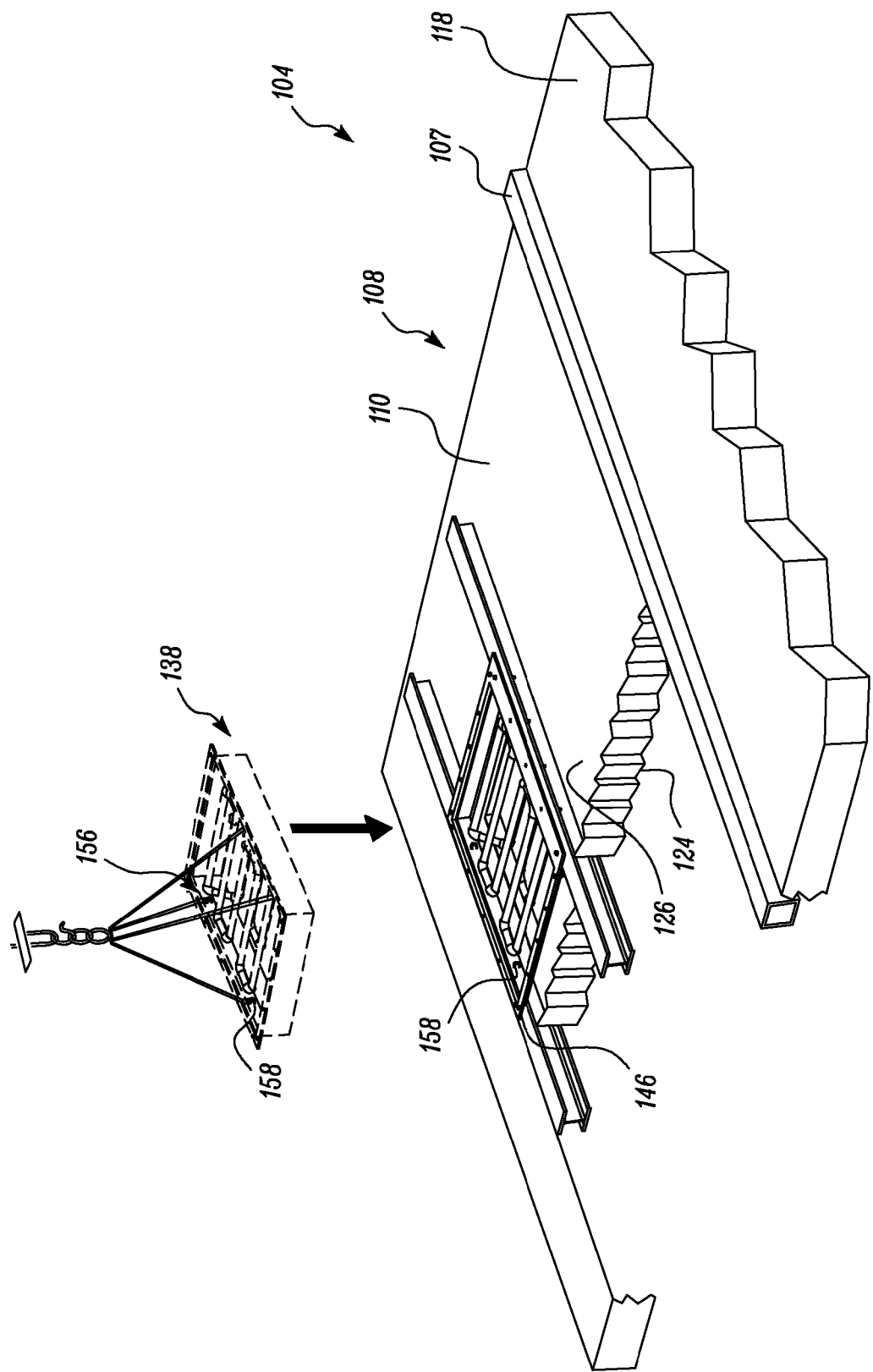
FIG. 4 illustrates the heat exchanger of FIGS. 2 and 3 attached to a front end panel of a power system enclosure.
Figure 5:
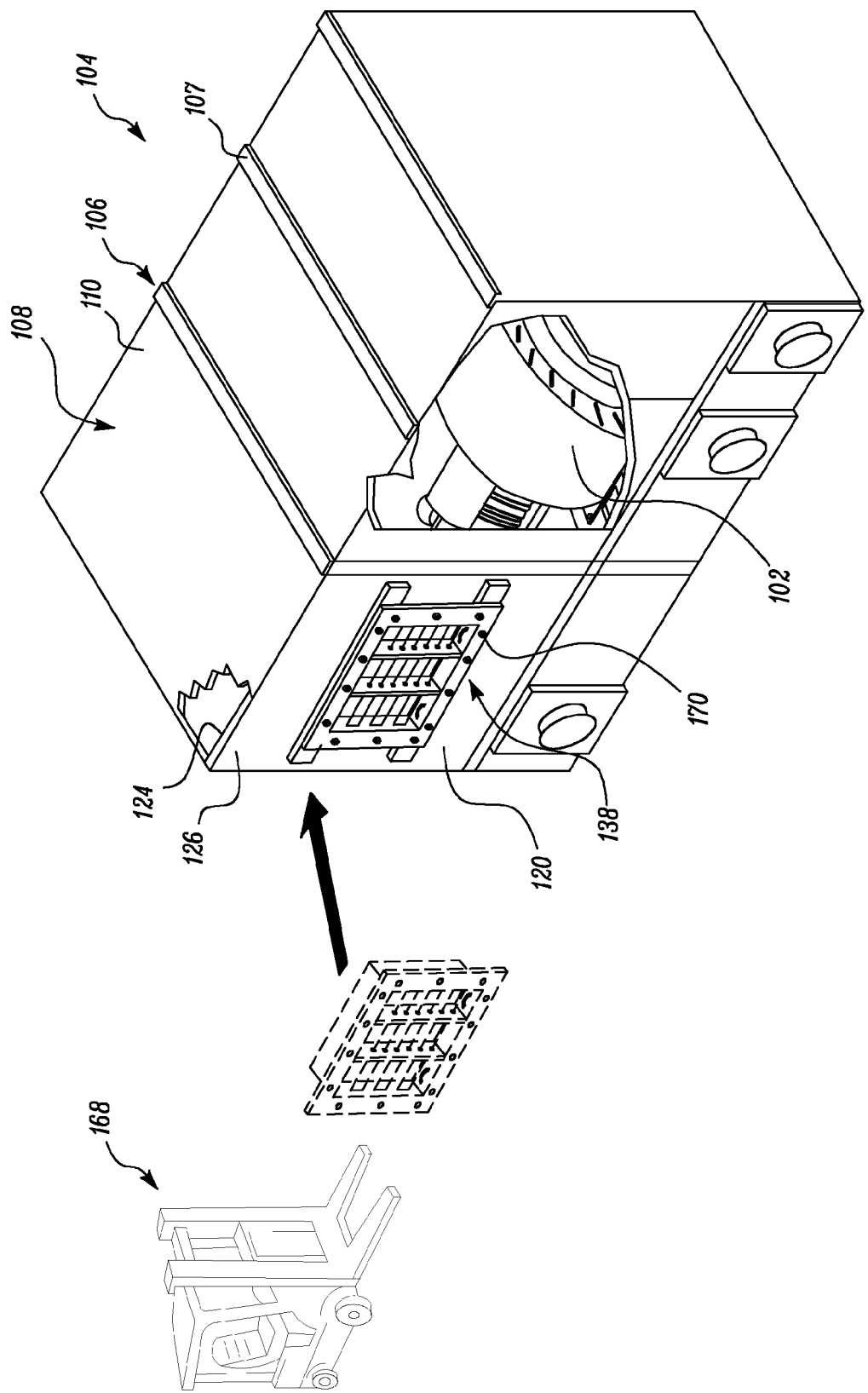
FIG. 5 illustrates the heat exchanger of FIGS. 2 and 3 attached to a side panel of the power system enclosure.

For the purposes of understanding the various embodiments of the present disclosure, the first end panel 110 with the inlet receptacle 112 is shown in FIG. 4, and one of the side panels 120 with the inlet receptacle 112 is shown in FIG. 5. In an embodiment as illustrated in FIG. 4, the heat exchanger 138 is disposed on the first end panel 110 of the enclosure 104. The flange 146 is configured to be removably attached to the outer surface 126 around the first end panel 110 via one or more threaded fasteners 170 removably fastened to the threaded receptacles 148 disposed on the flange 146. Alternatively, in an embodiment as illustrated in FIG. 5, the heat exchanger 138 is configured to be removably attached to the outer surface 126 around the one of the side panels 120. In an embodiment, the heat exchanger 138 may be hoisted over the enclosure 104 using the lifting eyes 158 and then received within the inlet receptacle 112 such that the flange 146 rests over the outer surface 126 of the first end panel 110. Similarly, in the alternative configuration, the heat exchanger 138 may be lifted using apparatus such as a forklift 172 and then received in the inlet receptacle 112 disposed on the one of the side panels 120 such that the flange 146 rests on the outer surface 126 of the side panel 120.

INDUSTRIAL APPLICABILITY

The industrial applicability of the heat exchanger for the power system enclosure described herein will be readily appreciated from the foregoing discussion.

Typically a power system enclosure is designed to be space efficient to enable an ease of placement in various application areas. The power system enclosure accommodates a power source, multiple thermal detectors, gas sensors, gas nozzles, and other such mountings and accessories. In case where the power source may be a dual fuel engine such as a turbine engine, a heat exchanger may also be provided in the power system. Conventionally, the heat exchanger may be fastened from an inside of the power system enclosure. The assembly process of the heat exchanger may be cumbersome due to interference with the various mountings and accessories associated with the power system. Furthermore, due to large dimensions of conventional heat exchangers, placement of the heat exchanger reduces an effective space in the power system enclosure, hence a displacement of the power source for field service/repair may be obstructed. Moreover, removal of heat exchangers for service/repair requires trained personnel due to lack of space and specialized removal equipment.

Figure 6:
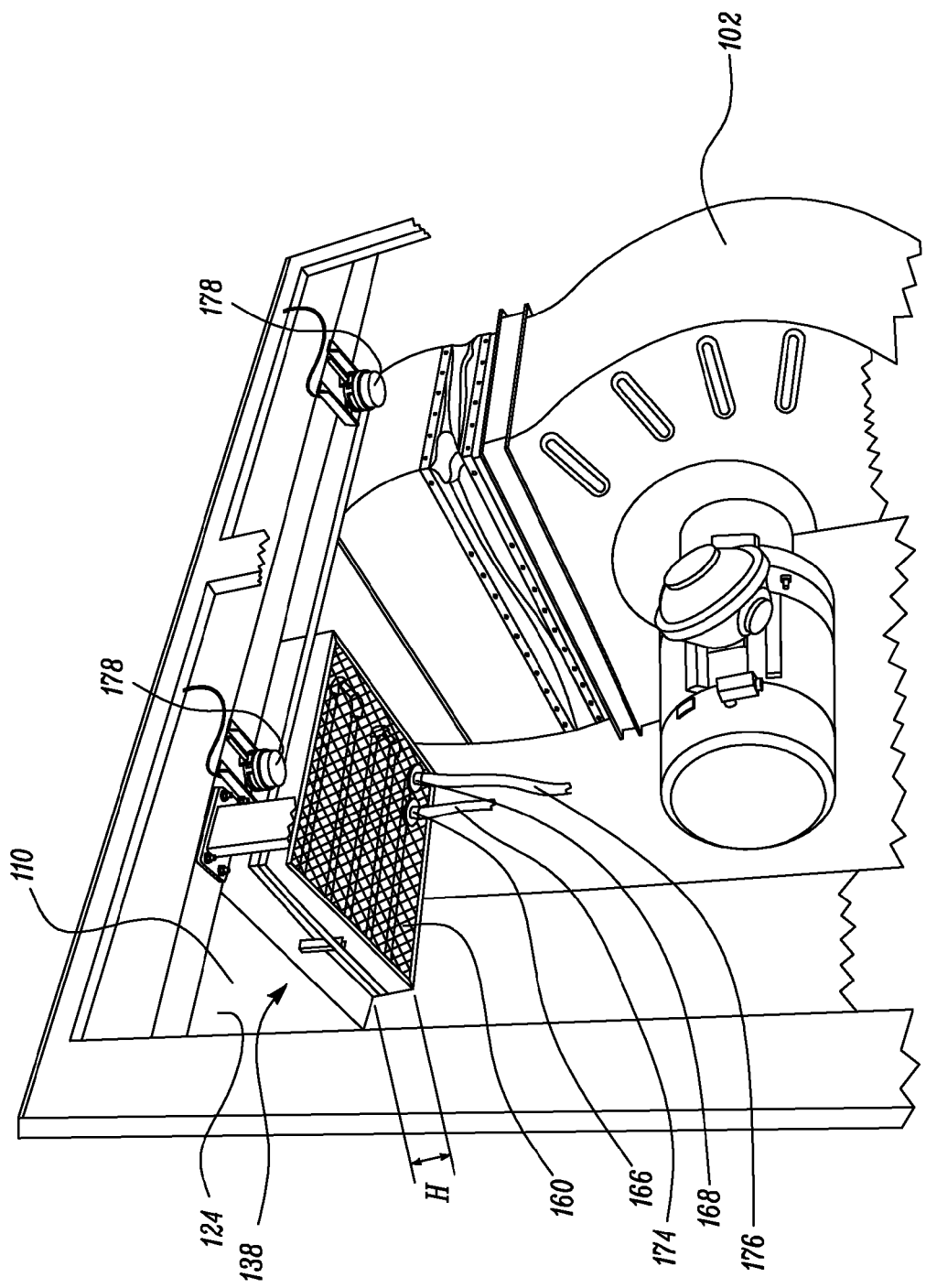
FIG. 6 illustrates a detailed inside view of the power system enclosure.

FIG. 6 illustrates a detailed inside view of the power system enclosure 104 of the present disclosure. In an exemplary embodiment the heat exchanger 138 may be configured to provide a purge air to a purge module (not shown) of the turbine engine 102. In an aspect of the present disclosure, the inlet end 166 of the heat exchange tube 150 is fluidly coupled to a combustor (not shown) and the outlet end 168 is fluidly coupled to the purge module via an inlet tube 174 and an outlet tube 176 respectively. The inlet tube 174 is configured to communicate a hot turbine air coming off the turbine compressor to the heat exchanger 138. The heat exchanger 138 is configured to cool the hot turbine air with incoming air from the enclosure inlet vent component 134 and provide the purge air to the purge module via the outlet tube 176. In an embodiment, the purge air may be configured to purge one or more fuel lines (not shown) associated with the turbine engine 102.

As illustrated in FIG. 6, the power system enclosure 104 includes one or more thermal detectors 178. In an embodiment, the gas detectors 178 are installed on the inner surface 124 of the roof 108 adjacent to the inlet receptacle 112 and the outlet receptacle 116 of the enclosure 104. However in alternative embodiment, the thermal detectors 178 may be installed on the inner surface 124 of one of the side panels 120 adjacent to the inlet receptacle 112 and the outlet receptacle 116 of the enclosure 104. The thermal detector 178 is configured to detect a rise in a temperature inside the enclosure 104. A person having ordinary skill in the art may acknowledge that the locations the thermal detector 178 disclosed herein are exemplary in nature and may change depending on inter-relative positions of the power source 102, the ventilation system 132, the inlet receptacle 112 and the outlet receptacle 116.

As illustrated in FIG. 6, the heat exchanger 138 of the present disclosure is configured to be placed from outside of the enclosure 104 such that the mountings and accessories are not interfered with. Moreover, the screen 160 attached to the second side 144 of the heat exchanger 138 prevents a contact of an operator to the heat exchange tube 150 of the heat exchanger 138. In an embodiment, as shown in FIG. 4, the heat exchanger 138 may be "dropped-in" the inlet receptacle 112 such that the flange 146 rests on the outer surface 126 around the inlet receptacle 112 disposed on the first end panel 110. In another embodiment, as shown in FIG. 5, the heat exchanger 138 may be "pushed-in" the inlet receptacle 112 defined on the one of the side panels 120. It will be appreciated by one skilled in the art that in the both the embodiments disclosed herein, the heat exchanger 138 may be easily installed to the power system enclosure 104 and conveniently removed for repair/service.

From the foregoing it will be appreciated that, although specific embodiments have been described herein for purposes of illustration, various modifications or variations may be made without deviating from the spirit or scope of inventive features claimed herein. Other embodiments will be apparent to those skilled in the art from consideration of the specification and figures and practice of the arrangements disclosed herein. It is intended that the specification and disclosed examples be considered as exemplary only, with a true inventive scope and spirit being indicated by the following claims and their equivalents.

What is claimed is:

1. A heat exchanger for a power system, the heat exchanger comprising:
   a housing including a first side and a second side, the second side configured to be received in a receptacle of a power system enclosure;
   at-least one heat exchange tube supported between one or more of side walls of the housing;
   a screen attached to the second side of the housing, the screen including at-least one inlet opening for the heat exchange tube, and at-least one outlet opening for the heat exchange tube; and
   a flange attached to the first side of the housing wherein the flange configured to be removably attached to an outer surface around the receptacle of the power system enclosure.

2. The heat exchanger of claim 1 further comprising a lifting arrangement.

3. The heat exchanger of claim 2, wherein the lifting arrangement including at-least one lifting eye.

4. The heat exchanger of claim 1, wherein a height of the heat exchanger lies in a range of about 4 inches to 6 inches.

5. The heat exchanger of claim 1 further includes one or more supports extending between the side walls, wherein the supports support the heat exchange tube.

6. The heat exchanger of claim 1 configured to receive hot air from the power system via the inlet opening.

7. The heat exchanger of claim 1 configured to provide purge air to the power system via the outlet opening.

8. The heat exchanger of claim 1 is an air to air heat exchanger.

9. A power system comprising:
   a power source;
   a power system enclosure enclosing the power source; and
   a heat exchanger including:

a housing including a first side and a second side, the second side is received in a receptacle of the power system enclosure;

at-least one heat exchange tube supported between one or more of side walls of the housing;

a screen attached to the second side of the housing, the screen including at-least one inlet opening for the heat exchange tube, and at-least one outlet opening for the heat exchange tube; and a flange attached to the first side of the housing wherein the flange is removably attached to an outer surface around the receptacle of the power system enclosure.

10. The power system of claim 9, wherein the receptacle is at least one of an inlet receptacle and an outlet receptacle provided on the power system enclosure.

11. The power system of claim 9, wherein the power system enclosure including:

a frame disposed around the power source;

a roof attached to the frame; and one or more side panels disposed on the frame, and wherein the receptacle is provided on at least one of the roof and the side panels.

12. The power system of claim 9, wherein the flange includes one or more threaded receptacles.

13. The power system of claim 9, wherein the heat exchanger further includes one or more supports extending between the side walls, wherein the supports support the heat exchange tube.

14. The power system of claim 9, wherein the heat exchanger further including a lifting arrangement.

15. The power system of claim 14, wherein the lifting arrangement including at-least one lifting eye.

16. The power system of claim 9, wherein a height of the heat exchanger lies in a range of about 4 inches to 6 inches.

17. The power system of claim 9, wherein the power source is a dual fuel engine.

18. The power system of claim 9, wherein the heat exchanger is configured to receive a hot air from the power system via the inlet opening.

19. The power system of claim 9, wherein the heat exchanger is configured to provide a purge air to the power system via the outlet opening.

20. The power system of claim 9, wherein the heat exchanger is an air to air heat exchanger.

\* \* \* \* \*